H. T. FOGG.
SEPARATOR.
APPLICATION FILED DEC. 1, 1915.
1,202,985.
Patented Oct. 31, 1916.
4 SHEETS—SHEET 1.
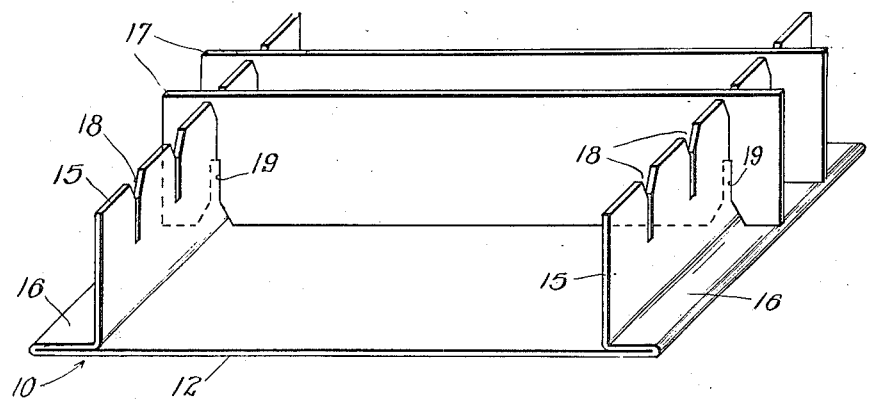
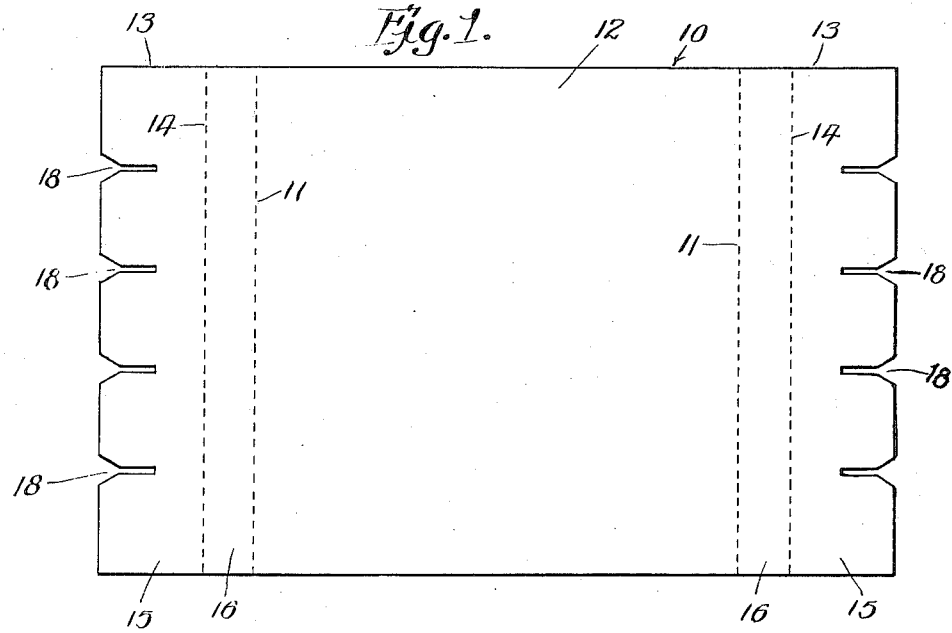
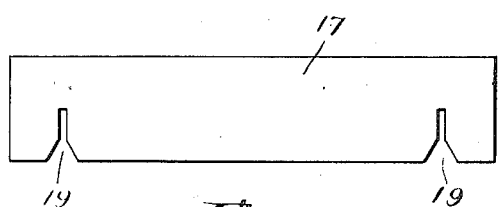
Witnesses:
Inventor:
H. T. Fogg.

H. T. FOGG.
SEPARATOR.
APPLICATION FILED DEC. 1, 1915.
1,202,985.
Patented Oct. 31, 1916.
4 SHEETS—SHEET 2.
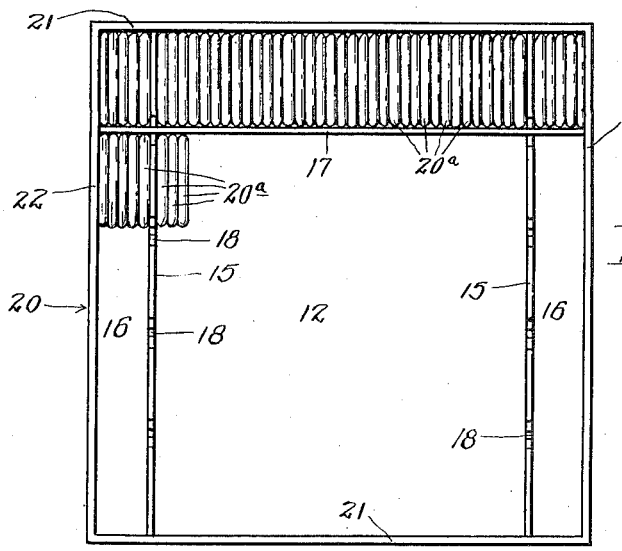
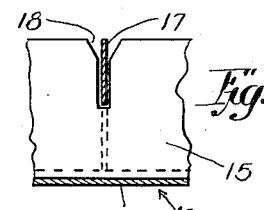
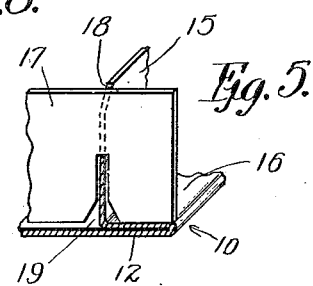
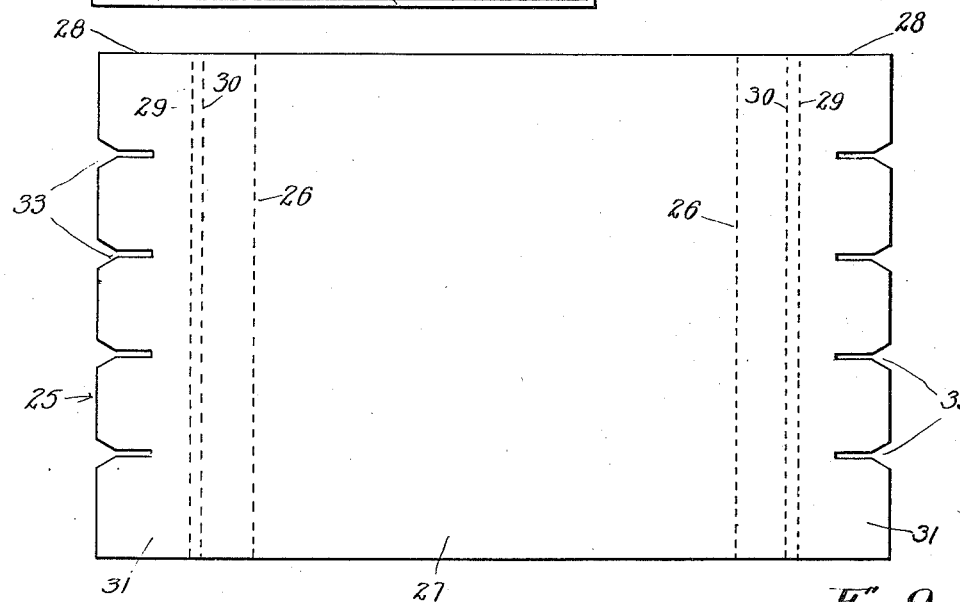
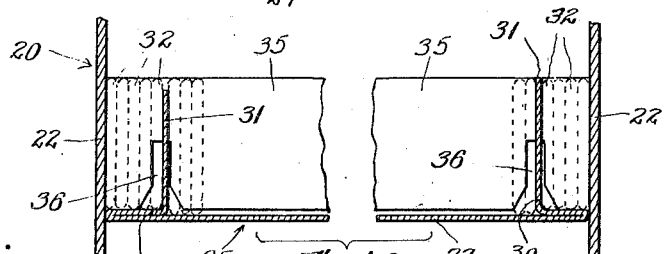
Witnesses:
Inventor:
H. T. Fogg.
By Attys.

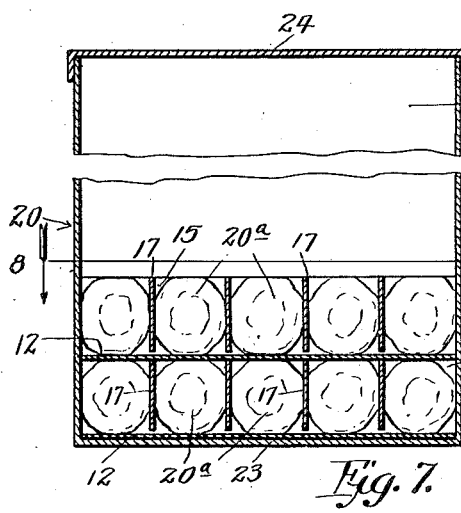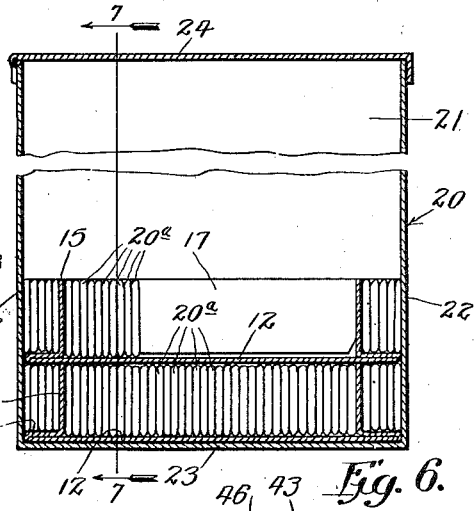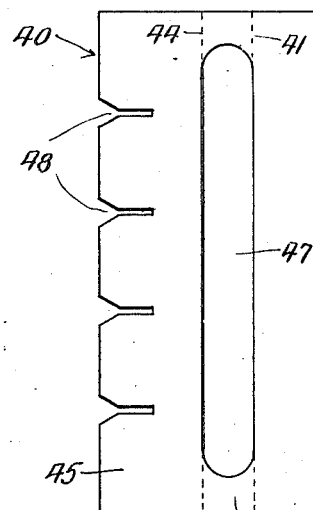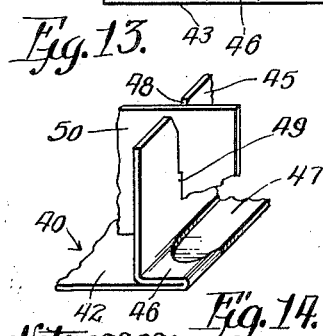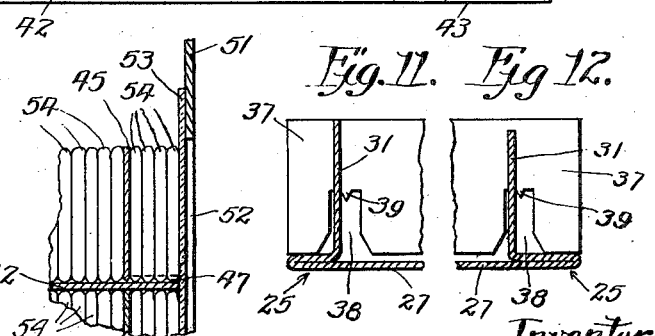

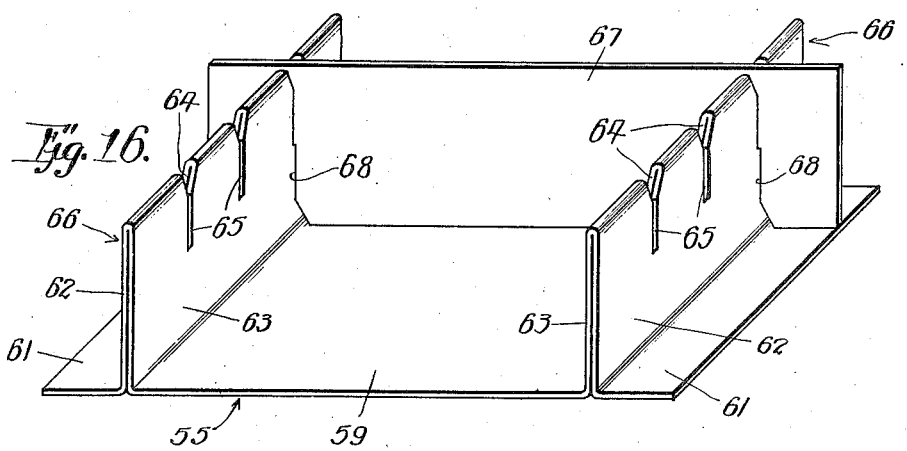
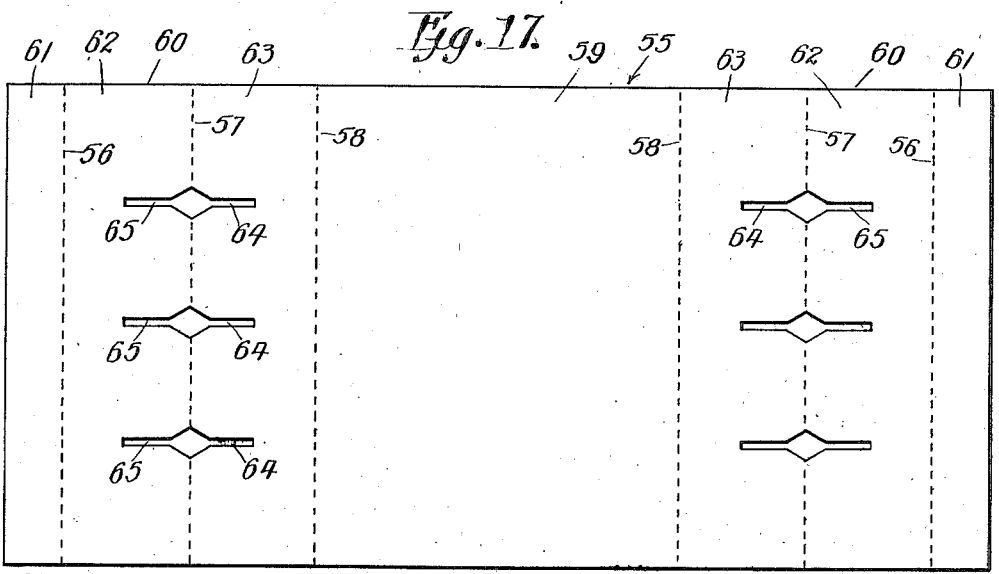
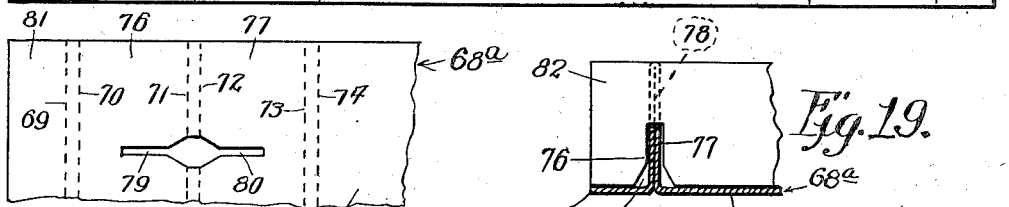

UNITED STATES PATENT OFFICE.

HERBERT T. FOGG, OF EAST ORANGE, NEW JERSEY, ASSIGNOR TO NATIONAL BISCUIT COMPANY, OF NEW YORK, N. Y., A CORPORATION OF NEW JERSEY.

SEPARATOR.

1,202,985.  Specification of Letters Patent.  Patented Oct. 31, 1916.

Application filed December 1, 1915.  Serial No. 64,398.

*To all whom it may concern:*

Be it known that I, HERBERT T. FOGG, a citizen of the United States, and a resident of East Orange, in the county of Essex and State of New Jersey, have invented certain new and useful Improvements in Separators; and I do hereby declare that the following is a full, clear, and exact description thereof, reference being had to the accompanying drawings, and to the reference characters marked thereon, which form a part of this specification.

This invention relates to separators, such as are made of relatively stiff paper, fiber-board, or other like sheet material and adapted for insertion in receptacles, such as boxes, cartons, or "caddies," between the superposed layers of biscuits, crackers, or other like bakery products packed in such receptacles, for the purpose of separating said layers and dividing the articles in each layer into rows, so as to prevent the articles in one layer, as well as one row, from coming into contact with and injuring or damaging the articles in the next adjacent rows and layers during the handling of the packed receptacle in transportation as well as by the merchant about the retail store.

In packing biscuits, crackers, or other like bakery products in boxes, cartons, or "caddies" usually employed as shipping as well as dispensing receptacles, such articles are packed in said receptacles in superposed layers with the articles in each layer arranged on edge and in rows. Heretofore flat sheets of relatively stiff paper-board or the like have been placed horizontally in the box between the superposed layers for the purpose of separating the same one from the other, and "ready made" or assembled crates, composed of intersecting flat partition strips arranged on edge, have been placed as a complete unit and in set up form on each partition sheet for the purpose of separating the articles in each layer into rows. Consequently, in packing a container it required handling as separate and distinct units first the flat partition sheets and then the completely set up crate therefor, with the result that much time and labor was required in handling said parts and placing the same in the box during the process of packing thereof. Moreover, when a complete and set up crate is used and placed in the box, all the cells or compartments constituting the rows are formed before any of the articles are packed therein, with the result that the packing space is limited and confined to the width of each row. This method of packing is both troublesome and expensive, not only because of the fact that separate partition sheets and crates must be handled for each layer, but because the packer need exercise undue care in placing the articles in the cells formed by the crate.

Among the objects of my invention is to overcome the difficulties above noted by providing a form of separator wherein the body part serves as the flat partition sheet, with which are combined several of the partition strips of a crate, so as to form in effect a combined partition sheet and crate, which may be handled and packed in the box as a complete unit.

A further object of my invention is to provide a combined partition sheet and crate wherein the latter is built up or formed in the box as the packing of each row progresses, thereby giving the packer initially more space in which to pack than provided by the set up crates heretofore used.

The invention also relates to the blank from which said separator is made.

The invention consists further in the matters hereinafter described and more particularly pointed out in the appended claims.

In the accompanying drawings—Figure 1 is a plan view of a cut and scored blank from which a separator embodying the features of my invention is formed; Fig. 2 is a perspective view of the separator set up from the blank shown in Fig. 1; Fig. 3 is a plan view of one of the partition strips used with the separator shown in Fig. 2; Figs. 4 and 5 are vertical sectional views illustrating details of construction to be hereinafter described; Fig. 6 is a vertical sectional view of a box or container having a plurality of superposed rows or layers of biscuits, crackers, or like bakery products packed therein, and showing separators constructed in accordance with my invention packed in said box between the superposed layers of crackers or the like; Fig. 7 is a vertical sectional view taken on line 7—7 of Fig. 6; Fig. 8 is a horizontal sectional view taken on line 8—8 of Fig. 7, parts being omitted for the sake of clearness of illustration; Fig. 9 is a plan view of a cut and scored blank from which another form of separator embodying the features of my invention is formed; Fig. 10 is a fragmentary vertical sectional view of a box or container in which is packed or placed a separator set up from the blank shown in Fig. 9; Figs. 11 and 12 are vertical sectional views illustrating further details of construction to be hereinafter described; Fig. 13 is a plan view of a cut and scored blank from which another form of separator embodying the features of my invention is formed; Fig. 14 is a fragmentary perspective view of a separator set up from the blank shown in Fig. 13; Fig. 15 is a fragmentary vertical sectional view of a box or container having a sight opening in its front wall and showing packed or placed therein a separator such as set up from the blank shown in Fig. 13; Fig. 16 is a perspective view of a set up separator embodying the features of my invention and differing slightly in construction from the separator shown in the preceding figures; Fig. 17 is a plan view of a cut and scored blank from which the separator shown in Fig. 16 is formed; Fig. 18 is a fragmentary plan view of a cut and scored blank from which is formed a separator embodying the features of my invention, but differing in construction from the separators shown in the foregoing figures; and Fig. 19 is a fragmentary vertical sectional view of the separator set up from the blank shown in Fig. 18.

Referring to the accompanying drawings, illustrating in detail a separator embodying the features of my invention, 10 in Fig. 1 designates a blank, in flat form, from which the separator is made. As shown, said blank 10 is rectangular in form and is made from a sheet of relatively stiff material, such as paper-board, fiber-board, or the like. Said blank 10 is provided adjacent each end thereof with a score or fold line 11, 11 extending transversely across the blank and parallel to each other as well as to the end margins of said blank. Said score or fold lines 11, 11 divide the blank into a rectangular body portion 12 and end marginal strips 13, 13. Said body portion 12 constitutes the flat bottom wall of the separator, when the latter is set up as shown in Fig. 2. Each end strip 13 is divided lengthwise into two sections 15, 16 by a score or fold line 14, the latter being parallel to the adjacent score line 11 and arranged between the same and the adjacent end margin of the blank. In setting up the separator from said cut and scored blank 10, said end strips 13, 13 are bent or turned inward toward each other on the score or fold lines 11, 11 until the sections 16, 16 are brought into a position overlapping the bottom wall 12 and forming a double thickness of sheet material along the end margins of said separator. The end sections 15, 15 are then turned into an upright position on said score or fold lines 14, 14 so that said sections extend at right angles above and across the bottom wall 12 and form upright flanges adjacent the ends of said separator. (See Fig. 2.) The end margins of the separator 10 are now formed by the folded edges along said score lines 11, 11, and said upright flanges 15, 15 are spaced inward from such folded edges by the sections 16, 16. When thus set up, said separator 10 appears as shown in Fig. 2, with the exception that the partition strips 17, 17, illustrated in said figure, are omitted. Each end flange 15, 15 is provided along its longitudinal edge with a plurality of laterally spaced, parallel notches 18, 18 opening outwardly through the longitudinal edge of said flange. As shown, each notch 18 extends into the flange a short distance and is in alinement with the corresponding notch 18 in the opposite flange 15. There is an equal number of notches 18, 18 in each flange, and the number of notches in each flange depends upon the number of rows of articles packed in each layer. For the sake of illustration, however, I have shown each flange 15 as being provided with four notches 18, 18, thereby forming five rows in each packed layer.

When the flanges 15, 15 are set up, the same are arranged opposite each other, and, in order to divide the space therebetween into a plurality of compartments or cells, the end walls of which are formed by said flanges, I provide as many of said partition members or strips 17 as there are notches in one flange 15. Said partition strips 17, 17 are made exactly alike, and a description of one will therefore suffice for all. As shown in Fig. 3, said partition strip 17 is cut or made from a flat sheet of relatively stiff material, such as paper-board, fiber-board, or the like. Said partition strip 17 is rectangular in form and is made long enough to extend across the set up separator 10 from one folded end margin thereof to the other, as well as across the space between said upright flanges 15, 15. Said partition strip 17 is preferably as wide as the height of the flange 15, and is provided adjacent each end thereof with a notch 19, 19 opening downward through the lower longitudinal edge thereof. (See Fig. 3). Said notches 19, 19 are similar in shape to the notches 18, 18 in the flanges 15, 15. When in use, each partition strip 17, 17 is placed on edge, so as to extend across the separator between the upright flanges 15, 15, with the notches 19, 19 in the strip extending downward and interfitting or interlocking with the associated notches 18 in said flanges 15, 15, as shown in Fig. 2. The notch 18 in the flange 15 opening upward, and the notch 19 in the partition strip 17 opening downward, the portion of said strip 17 above its notch extends through the notch 18 in the flange 15, while the portion of said flange 15 below its notch 18 extends through the notch 19 in said partition strip 17, as clearly shown in Figs. 4 and 5. Each notch 18, 19 is made wide enough to receive the part that extends therethrough, and when the partition strips 17, 17 are in place, the latter serve to hold said flanges 15, 15 in their upright positions, and prevent the same from being turned or bent on their fold lines 14, 14. Moreover, said flanges 15, 15 serve to hold said strips 17, 17 in their upright positions, and also prevent the strips from moving endwise of the separator. When the parts are set up, the portions of the partition strips 17, 17 extending between the upright flanges 15, 15 divide the space therebetween into a plurality of compartments or cells, the side and end walls of which are formed by said strips and flanges, respectively. The bottom wall of each cell is formed by the bottom wall 12 of the separator. The end portions of said strips 17, 17 extend beyond the upright flanges 15, 15 and serve to divide the space beyond said flanges into compartments or cells in alinement with the cells between said flanges. Each notch or slot 18, 19 may be provided with a flared entrance end, if desired, or the notch may be made in any shape in order to readily receive and guide the interfitting part thereinto.

The separator 10 is used in the following manner: In Figs. 6, 7, and 8, I have shown a box or container 20 made either of heavy fiber-board or sheet metal and having four connected upright marginal walls 21, 22, and a bottom wall 23. Said box 20 is provided with a removable or hinged lid or cover 24 adapted to close its open upper end, as customary in boxes of this character. The box or receptacle 20, referred to, may constitute what is known in the trade as a "caddy" and in which are packed, on edge and in rows and in superposed layers, biscuits, crackers, or other like bakery products. In said Figs. 6, 7, and 8, I have shown said crackers or biscuits in full lines and indicated by the reference numeral 20ª. In packing said box 20, a set up separator 10, such as shown in Fig. 2 and with the partition strips 17, 17 omitted, is first placed in the box with the bottom wall 12 of the separator bearing flatwise against the bottom wall 23 of said box, and with the flanges 15, 15 of said separator extending upward. In the box 20 shown in Figs. 6, 7, and 8, the upright marginal walls 21, 21 may constitute the side walls of the box, while the upright marginal walls 22, 22 may constitute the front and rear walls of said box. The bottom wall 12 of the separator is made of such size as to fit snugly in the box, and may be inserted therein with its folded end margins abutting against or in contact with the inner faces of said front and rear walls 22, 22. One partition strip 17 is then inserted in the box and extended across the upright flanges 15, 15 with the notches 19, 19 of said strip interlocked or engaged with the notches 18, 18 in said flanges 15, 15 next adjacent to one of the side walls 21 of said box. When thus positioned, said partition strip 17 extends across the separator and between the front and rear walls 22, 22 of the box, as shown in Fig. 8, and forms with the adjacent box wall 21 the first compartment or cell in which the crackers or biscuits 20ª are packed in a row. Said articles 20ª are packed on edge between said box wall and said strip 17 and constitute the first row of articles in the bottom layer. After the first row has been packed, the articles 20ª for the second row are placed on edge on the opposite side of said partition strip 17. At this time, only one partition strip 17 is in position, as shown in Fig. 8, and it follows that the packer in placing the second row of crackers against said strip 17 is not limited as to space for the second row, nor hampered by any other partition strips being in the box. After the second row is packed, a second partition strip 17 is placed in the box and engaged with the flanges 15, 15, so as to inclose the second row and permit the third row to be packed. A partition strip 17 is placed in the box as the packing of the bottom layer progresses, and it will be noted that the crate is built up or formed as the packing progresses.

As shown in Figs. 6 and 8, each row includes the articles 20ª that are packed between the flanges 15, 15 and the opposed box walls 22, 22, such articles being separated from the ones in the same row between the flanges 15, 15 by the latter. After the bottom layer has been packed, a second separator 10 is placed in the box and upon the upper edges of the flanges and strips of the bottom separator. The partition strips 17, 17 of the second separator are engaged with the upright flanges 15, 15 thereof as the second layer of articles is packed, in the same manner as above described for the bottom layer. After the second layer is complete, the next or third layer is packed, and so on until the box is filled. The bottom walls 12 of said separators 10 serve as flat partition sheets between the superposed layers of articles packed in the box, and thereby prevent the articles in one layer from coming into contact with and damaging the articles in the next and adjacent layers. The flanges 15, 15 and the partition strips 17, 17 of each separator 10 serve to provide a crate construction for each layer and separate the articles therein in rows. The flanges 15, 15 of the crate construction being integral with the bottom wall 12 of the separator, it follows that the partition sheets and the crates are in effect combined and may therefore be used and handled as a complete or single unit. The advantage flowing from this construction resides in the fact that the flat partition sheet and crate layer may be handled and inserted in the box as a single unit, thereby avoiding the necessity of handling and use of a separate flat partition sheet and completely set up and assembled crate layer, as heretofore required. By reason of this fact, there is not only a saving in the amount of labor and time heretofore required to pack a box, but it is unnecessary to keep a supply of separate crates in stock. Furthermore, with my device the crate is built up as the packing of each layer progresses, which provides initially more space for the packing of the articles during the packing process, and thereby increases the output of the packer.

In case the articles being packed vary in thickness, it may be necessary to use a combined separator and crate layer wherein the distance between its upright flanges may be varied, in order to compensate for the varying thickness of the articles being handled. In such case, I may make a separator such as shown in Figs. 9 and 10. In Fig. 9, I have shown a blank 25, in flat form, from which said separator is made. As illustrated, said blank 25 is rectangular in form and is made from a sheet of relatively stiff material, such as paper or like board. Said blank 25 is substantially the same as the blank 10 shown in Fig. 1, with the exception of the features to be now described. Said blank 25 is divided transversely by score or fold lines 26, 26 into a body portion 27 and end strips 28, 28, said body portion 27 constituting the flat bottom wall of the separator when the latter is set up and in use. (See Fig. 10.) Each end strip 28, 28 is divided longitudinally into three sections by score or fold lines 29, 30, the latter being arranged closely adjacent each other and parallel to the score lines 26, 26 and to the end margins of the blank. The sections of the blank between its end margins and the score lines 29, 30 form the upright flanges 31, 31, when said blank is set up, and said flanges 31, 31 may be turned upward into an upright position on either one of said score lines 29, 30.

When crackers or like articles 32, 32 of one thickness are being packed in the container, the flanges 31, 31 of the separators used are turned upwardly into their upright positions on the innermost score or fold lines 30, 30, so as to make the spaces between said upright flanges 31, 31 and the opposed box walls 22 wide enough to receive an equal number of such articles, say five as shown at the left in Fig. 10. On the other hand, if the crackers or like articles being packed are of a less thickness, the flanges 31, 31 of the separators are turned into their upright positions on the outermost score or fold lines 29, 29, so that the spaces between said flanges and the opposed box walls 22 will receive an equal number of such articles, say four as shown at the right in said Fig. 10. Manifestly, should one batch of crackers or like articles being packed vary in thickness from another batch, the flanges 31, 31 could be turned up on the proper score or fold lines 29, 30 so as to compensate for the variation in the thickness of the articles, and thereby have each compartment or cell at each end of the separator properly packed. In other words, with the construction described, the end compartments may be properly filled, and the articles therein prevented from moving or shifting laterally in a manner to damage or crush one another during the handling of the packed container. As shown, said flanges 31, 31 are each provided with an equal number of upwardly opening notches 33, 33, the same as provided in the separator 10 shown in Figs. 1 and 2. When the flanges 31, 31 are bent upwardly on the innermost score lines 30, 30, the distance between said flanges is less than the distance between said flanges when the same are bent upwardly upon the other or outermost of said score lines 29, 29, or, in other words, the distance between each upright flange 31 and its opposed box wall 22 is greater in the former case than in the latter. In order to compensate for this variation, I employ with said separator 25 a set of partition strips 35, such as shown in Fig. 10. Said partition strip 35 is provided adjacent each end with a downwardly opening notch 36, the same being made wider than the notch 18 in the strip 17 hereinbefore described. Said notch 36 is made wide enough to compensate for the varying upright positions of the flange 31. For instance, if each flange 31 is turned upward on its innermost score line 30, said flange 31 then occupies an upright position in substantial contact with the innermost side edge of its associated notch 36, such as shown at the left in Fig. 10. On the other hand, if each flange 31 is turned up on the outermost score line 29, said flange 31 then occupies an upright position against the outer side edge of its associated notch 36, as shown at the right in Fig. 10. In short, the notch 36 is made wide enough to interlock with the flange 31 in either of its two upright positions. Except for the difference noted, said notches 33, 36 are similar to the notches 18, 19 before described. The partition strip 35 is made as wide as the height of the flange 31 when the latter is turned upwardly on the outermost score line 29, so that the upper edge of said flange 31 will not project above the upper edge of said strip 35. (See Fig. 10.) In packing a box with the use of a combined separator and crate layer 25, as shown in Figs. 9 and 10, the same method is followed as described in connection with the separator shown in Figs. 1 and 2.

With the wide notch 36, the packed crackers 32 are depended upon to hold the flanges 31, 31 in their upright positions, but in order to provide positive locking means for this purpose, I may employ a partition strip 37 wherein each of its notches 38, 38 is provided with a depending locking tongue 39, 39 adapted to engage on either side of the associated flange 31, as is clearly shown in Figs. 11 and 12. Thus, if the flange 31 is turned up on the score line 29, the locking tongue 39 extends downward on the inner side of said flange, as shown in Fig. 11, while, on the other hand, if the flange 31 is turned up on the innermost score line 30, said tongue 39 extends downward on the outer side of said flange, as illustrated in Fig. 10. When the parts are set up and interlocked, said depending tongues 39, 39 serve to hold said flanges 31, 31 in their upright positions, and also serve to prevent said partition strips 37, 37 from shifting or moving endwise in the handling of the packed receptacle. Said tongue 39 may be made in any shape desired as long as it accomplishes the purposes for which it is designed.

When packing a box or container provided in its front wall with a sight opening, several of the packed separators extend across said sight opening and may be viewed through the pane of glass or other transparent sheet covering the opening. In other words, the separators are so arranged in the box that the crackers at the end of the rows adjacent the sight opening will be on edge and bear flatwise against the inner face of the glass or other transparent sheet covering the sight opening. When so arranged, it is desired that that portion of the end margin of the separator extending across the sight opening be a single and not a folded one, as would be the case if the separator shown in Figs. 1 and 2 was used. To accomplish this result, I make a separator from a flat, rectangular blank 40, such as shown in Fig. 13. Said blank 40 is cut or made from a sheet of relatively stiff material, such as paper or like board, and is divided transversely adjacent each end thereof by a score or fold line 41 into a rectangular body portion 42 and marginal end strips 43, 43. Said body portion 42 forms the flat bottom wall of the separator, when the latter is set up as shown in Figs. 14 and 15. Each end strip 43 is divided lengthwise by a score or fold line 44 into two sections 45, 46, the latter being folded over and upon the body portion 42, when the former constituting the flange 45 is turned into an upright position on said score line 44. Between said score lines 41, 44 is provided an elongated slot or opening 47 extending transversely of the separator 40 and closed at its ends by the end portions of the section 46. When the separator 40 is set up, the edge of the slot 47 in alinement with the innermost score line 41 forms a single margin for the end of the separator, and thereby improves the appearance of such margin of the separator when viewed through said sight opening. The end portions of the sections 46, 46 serve to integrally connect the flanges 45, 45 with the body portion of the separator. Each flange 45 is provided with upwardly opening notches 48, 48 adapted to interfit or interlock with similar notches 49 formed in the partition strip 50, employed with said separator 40. In Fig. 15, I have shown a portion of the front wall 51 of a box in which separators 40 are placed. Said wall 51 is provided with a sight opening 52, the latter being covered by a pane of glass or other transparent sheet 53 located in said box. The separators 40, placed in said box between the superposed layers of crackers or biscuits 54, 54 packed therein, are arranged so that the separators which extend across said sight opening will have their end margins formed by the slots 47 extending across the sight opening. The separator 40 shown in Figs. 13, 14, and 15 is packed in the container with the articles in the same manner as hereinbefore described.

In order to provide increased strength and rigidity in the upright end flanges of the separator, so that said flanges will effectively support the weight of the layer of crackers and separator packed thereabove, I construct a separator as shown in Figs. 16 and 17. In Fig. 17, I have shown a flat blank 55, rectangular in form and from which the separator shown in Fig. 16 is formed. Said blank 55 is made from a sheet of relatively stiff material, such as paper-board, fiber-board, or the like, and is provided adjacent each end thereof with three equally spaced, parallel fold or score lines 56, 57, and 58. Said score lines extend transversely across the blank, and the innermost score lines 58, 58 divide the blank into a body portion 59 and end strips 60, 60. When set up, said body portion 59 constitutes the flat bottom wall of the separator as shown in Fig. 16. Said score or fold lines 56, 57, and 58 divide each end strip 60 into three sections 61, 62, and 63. The innermost section 63 is provided with a plurality of parallel, laterally spaced notches 64, 64, while the outermost section 62 is provided with a like number of similarly arranged and shaped notches 65, 65. The notch in one section is in alinement with the corresponding notch in the adjacent section, and the notches in said sections open into each other and through the score or fold line 57 dividing the sections one from the other. Each notch 64, 65 may be provided with a flared entrance end as shown, and each notch extends the same distance partially across the section in which it is provided. In other words, said notches 64, 65 are equal in length and serve the same purpose as the notches hereinbefore referred to. The blank 55 is set up by bending each end marginal strip 60 upwardly upon itself and upon the centrally disposed score or fold lines 57, 57, so as to bring the sections 62, 63 at each end of the blank flatwise into contact with each other and form the upright end flanges 66, 66 of the separator as shown in Fig. 16. The end sections 61, 61 are bent outwardly on the score or fold lines 56, 56 and lie in the same plane as the bottom wall 59. When the separator 55 is set up, the upright flanges 66, 66 are formed by a double thickness of sheet material, and the folded portions along the score lines 57, 57 constitute the upper or longitudinal edges of said upright flanges. The notches 64, 65 open upwardly through such folded edges and receive the partition strips 67, 67 which extend lengthwise of the separator and across the space between said upright flanges 66, 66. Each partition strip 67 employed is provided adjacent its ends with downwardly opening notches 68, 68 adapted to interlock or interfit with the associated notches in said flanges 66, 66. It is to be of course understood that there are as many partition strips 67, 67 employed with the separator 55 as there are notches in one doubled flange 66, and, further, that said separator or crate layer is packed in the box or container with the crackers or biscuits in the same manner as hereinbefore described in connection with the separator shown in Figs. 1 and 2. With each end flange 66, 66 made of a double thickness of sheet material, it follows that said flanges will possess sufficient rigidity to effectively support the articles packed in the layers thereabove.

Should it be desired to vary the width of the space formed between the double flanges 66, 66, as well as between a box wall and one or both of said flanges, I provide a rectangular, cut and scored blank 68<sup>a</sup>, as shown in Fig. 18. Said blank 68<sup>a</sup> is divided adjacent each of its end margins by three pairs of transversely extending, parallel score or fold lines 69, 70; 71, 72, and 73, 74, the latter dividing the blank into a body portion 75, which constitutes the flat bottom wall of said separator when the latter is set up for use. Said score or fold lines divide each end marginal strip beyond the score line 74 into two sections 76 and 77, the latter being separated one from the other by the intermediate pair of score lines 71, 72. When set up, said joined sections 76, 77 are brought flatwise in contact with each other and form the upright end flange 78 of a double thickness of sheet material, similar to the double flange 66 shown in Fig. 16. Each section 76 is provided with a plurality of parallel, laterally spaced notches 79, and each joining section 77 is provided with a like number and similarly arranged notches 80. The corresponding notches 79, 80 in said sections open into each other and through the pair of score lines 71, 72. When forming the upright flange 78, the sections 76, 77 composing the same may be folded or turned on either one of the intermediate pairs of score lines 71, 72. If folded on the score line 72, the base of the outermost section 76 is folded on the innermost of the outer pair of score lines 70, while the base of the inner or other section 77 is folded on the score line 74, so that the outwardly extending, marginal strip 81 will be in the same plane as the bottom wall 75 of the set up separator 68<sup>a</sup>. When set up, the notches 79, 80 in the two parts of the double flange 78 register and receive the partition strip 82 used with said separator. When thus set up, the height of the double upright flange 78 will be equal to the distance between the score lines 70, 72 and equal to the width of the partition strip 82, and the said double flange 78 will be spaced inwardly from the opposed box wall a distance equal to the width of the marginal strip 81 between the fold line 70 and the adjacent end margin of said blank. To decrease such distance, the sections 76, 77 may be folded on the outermost score line 71 of the intermediate pair. The bases of said sections are then folded on the score lines 69, 73. Thus the end strip 81 will be in the same plane as the bottom wall 75 of the separator, and the height of said upright double flange 78 will be the same as before, as the distance between the score lines 69, 71 is the same as the distance between the score lines 70, 72. The partition strip 82 is provided with a downwardly extending notch 83 for interlocking with the notched part of the upright double flange 78. (See Fig. 19.) With the double flange 78 folded on either of the sets of fold or score lines, as described, the length of the separator will remain unchanged, and, therefore, said separator will fit properly in the box regardless of which set of fold lines is used.

In all of the several forms of separators or combined partition sheets and crate layers shown and described, it will be noted that the end or transverse flanges of the crate construction are integral with and form a part of the flat bottom wall of the separator, and in packing a container or box with superposed layers of crackers and interposed separators the crate construction is built up or formed as the packing of each layer progresses, and it is not necessary, therefore, to form the complete crate before one layer is packed in the box.

Although I have shown and described herein in detail separators or combined partition sheets and crate layers embodying the features of my invention, it is of course to be understood that the details of construction and arrangement of parts illustrated may be variously modified and changed without departing from the spirit and scope of my invention, and I do not wish to be restricted to the details of construction and arrangement of parts shown, except as set forth in the annexed claims.

I claim as my invention:

1. A separator made of sheet material and adapted for use in a container for crackers, biscuits, and like articles, said separator comprising a flat body member having two oppositely disposed upright flanges projecting above said body member and being spaced inwardly from the adjacent marginal edges thereof, each of said flanges being provided with a notch extending thereinto and opening outwardly through the upper longitudinal edge thereof, and a partition strip formed of a single thickness of sheet material and extending between said flanges and having interlocking connection therewith.

2. A separator made of sheet material and adapted for use in a container for crackers, biscuits, and like articles, said separator comprising a flat body member having two oppositely disposed upright flanges connected therewith, said flanges projecting above said body member and being spaced inwardly from the adjacent marginal edges thereof, and a plurality of partition strips, each being a separate piece of sheet material and extending between said flanges and having interlocking connection therewith.

3. A separator made of sheet material and adapted for use in a container for crackers, biscuits, and like articles, said separator comprising a flat body member having two opposite marginal portions thereof folded backward and upward to provide oppositely disposed upright flanges projecting above said body member, and each of said flanges being provided with a notch extending thereinto and opening outwardly through the upper edge thereof.

4. A separator made of sheet material and adapted for use in a container for crackers, biscuits, and like articles, said separator comprising a flat body member having two opposite marginal portions thereof folded upwardly to provide oppositely disposed upright flanges extending above said body member, said flanges being spaced inwardly from the adjacent marginal edges of said body member, and a plurality of partition strips, each being a separate piece of sheet material and extending between said flanges, said strips and flanges having interlocking notches.

5. A separator made of sheet material and adapted for use in a container for crackers, biscuits, and like articles, said separator comprising a flat body member having a marginal portion thereof folded backwardly and upwardly to provide an upright flange extending above said body member, and a partition strip extending across said body member and arranged transversely to said flange, the latter and said strip having interlocking connection.

6. A separator made of sheet material and adapted for use in a container for crackers, biscuits, and like articles, said separator comprising a flat body member having two opposite marginal portions thereof folded backwardly and upwardly to provide oppositely disposed upright flanges extending above said body member, and a partition strip extending between said flanges and having interlocking connection with the same.

7. A separator made of sheet material and adapted for use in a container for crackers, biscuits, and like articles, said separator comprising a flat body member having two opposite marginal portions thereof folded backwardly and upwardly to provide oppositely disposed upright flanges extending above said body member, and a partition strip extending between said flanges, said partition strip and one of said flanges having interlocking notches.

8. A separator made of sheet material and adapted for use in a container for crackers, biscuits, and like articles, said separator comprising a flat body member having two opposite marginal portions thereof folded backwardly and upwardly to provide oppositely disposed upright flanges extending above said body member, and a partition strip extending between and beyond said flanges, the latter and said partition strip having interlocking notches.

9. A blank for a separator made from a single sheet of sheet material and divided on two opposite sides thereof by score or fold lines into a body portion and marginal strips, the latter being on opposite sides of said body portion, each strip being divided longitudinally by a score or fold line into two sections, the innermost one overlapping the body portion and extending inwardly from the adjacent margin thereof, when the strip is folded backwardly on said first mentioned score or fold line, and the outermost section forming an upright flange extending above the body portion, when the strip is turned upwardly on said second named score or fold line, and each outermost section being provided with an inwardly extending notch opening outwardly through the longitudinal margin thereof, and the notch in one section being in alinement with the corresponding notch in the opposite section.

In testimony that I claim the foregoing as my invention, I affix my signature in the presence of two witnesses, this 26th day of November, A. D. 1915.

HERBERT T. FOGG.

Witnesses:
WALTER E. LOWELL,
FREDERICK W. BODE.